United States Patent [19]
Foster et al.

[11] 3,966,449
[45] June 29, 1976

[54] SEALING GLASS COMPOSITION AND PROCESS

[75] Inventors: Betty Jane Foster; Rao Ramamohana Tummala, both of Wappingers Falls, N.Y.

[73] Assignee: International Business Machines Corporation, Armonk, N.Y.

[22] Filed: Feb. 10, 1975

[21] Appl. No.: 548,649

[52] U.S. Cl. ................................ 65/43; 106/47 R; 106/53
[51] Int. Cl.² .................. C03C 27/00; C03C 3/12; C03C 3/00
[58] Field of Search ........................ 65/43, 53, 47 R

[56] References Cited
UNITED STATES PATENTS
3,744,702   5/1973   Veres .................................... 65/43

Primary Examiner—Winston A. Douglas
Assistant Examiner—Mark Bell
Attorney, Agent, or Firm—David M. Bunnell

[57] ABSTRACT

A low temperature glass frit seal composition and process employs a paste including particulate lead glass, an organic vehicle, and small amounts of finely divided $TiO_2$. The $TiO_2$ prevents attack by residual organic vehicle on the lead glass during sealing and adjusts the coefficient of thermal expansion to be compatible with the substrate glass.

3 Claims, 3 Drawing Figures

SEALING GLASS COMPOSITION AND PROCESS

BACKGROUND OF THE INVENTION

This invention relates generally to glass compositions and sealing processes and more particularly to a low temperature lead glass frit sealing composition and process.

Glass materials are used in forming seals either to bond parts of a structure together in a gas-tight manner such as, for example, in forming gas display panels or in sealing the outer surface of an article such as a recording head.

The sealing materials should have softening points which are low enough so that the temperature which is necessary to form the seal does not cause thermal damage to the parts which are being sealed or bonded. The sealing materials should also have coefficients of thermal expansion which are compatible with the surfaces being sealed.

It is known to use devitrified lead glasses for forming seals because of their relatively low softening points. It is also known to include 5% or more of $TiO_2$ as part of the solid solution, lead glass compositions which acts to form a crystalline phase in the seal and which also lowers the coefficient of thermal expansion (CTE) so that the sealing glass will match the CTE of the surface being sealed.

Although, sealing temperatures in the order of 500° to 700°C are conventionally employed, some applications require sealing temperatures which are not much greater than 400°C in order to avoid thermal damage to the surfaces being sealed. We have found that a glass frit composition including a lead glass and an organic vehicle will provide low temperature sealing. However, a problem occurs in that the seals may be grey-black, porous, and poorly bonded. This is believed to be caused by the reaction of residue from the organic vehicle which remains in the glass composition even at temperatures where one would expect the vehicle to have been completely removed. A glass frit sealing composition and process has now been found which permits the use of low sealing temperatures and which provides high quality seals.

BRIEF SUMMARY OF THE INVENTION

In accordance with the invention a glass frit sealing composition is provided which comprises a paste including particles of lead glass, an organic liquid vehicle, and finely divided $TiO_2$.

Also provided is a process for forming a sealing glass layer comprising forming a layer of a paste including particles of a lead glass, finely divided $TiO_2$, and an organic liquid vehicle; drying the layer; and firing the layer in contact with the surface or surfaces to be sealed to remove the organic vehicle and fuse the glass particles.

DETAILED DESCRIPTION

Figure 1:
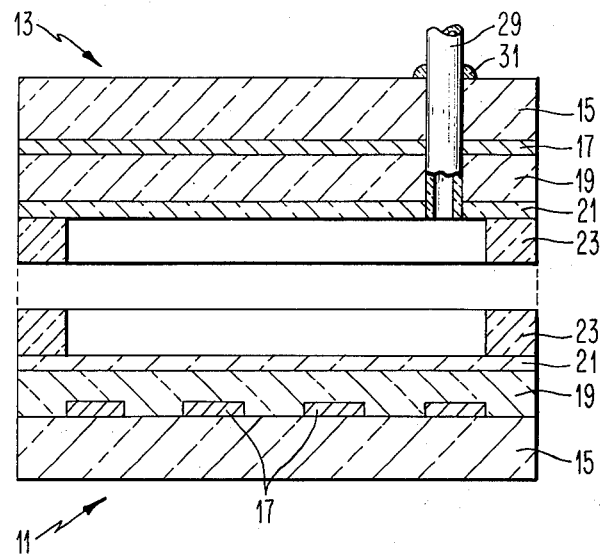
FIG. 1 is a side cross-sectional view of two parts of a gas panel to be sealed according to the process of the invention.

The glass compositions useful in the practice of the invention are lead glasses. These glasses have relatively low softening points and their composition is chosen in order to provide a softening point which is compatible with the surfaces to be sealed so that thermal damage does not occur to these surfaces during the sealing process. In the illustrated embodiments, it is desired that the sealing temperature be below about 420°C in order to avoid thermal damage. The lead glass composition, then, is chosen so that the sealing process can be carried out at about 400°C. Such compositions comprise for example, by weight from about 66% to about 76% PbO, from about 8.6% to about 14% $B_2O_3$, from about 2% to about 4% $SiO_2$, from about 0.7% to about 2% BaO, from about 10% to about 12% ZnO, from 0% to about 5% CuO, from 0% to about 1.7% $Al_2O_3$, and from 0% to about 0.2% $Na_2O$. The glass is used in the form of a powder in the size range preferably such that it will pass through a 325 mesh screen, U.S. standard sieve series, or a maximum particle size of about 50 microns.

The glass is mixed with an organic liquid vehicle to provide a paste composition which can be applied to the surface to be sealed such as by conventional means, for example, screen printing. The vehicle is chosen such that it will provide a paste having the correct viscosity to give the desired seal dimensions when applied, such as by screening, to the surfaces to be sealed. The vehicle is also chosen so that it can be removed during the sealing process and, desirably, prior to reaching the softening temperature of the lead glass. Suitable materials include, for example, terpineol, and a mixture of amyl acetate and nitrocellulose. Suitable viscosities are obtained when the liquid vehicle is employed in minor amounts of from about 5% to 20% by weight of total paste composition.

In order to provide a glass seal with a CTE which is compatible with the surfaces being sealed and to eliminate the problems associated with reaction between residual amounts of organic vehicle and the lead glass during the sealing process, a small amount of $TiO_2$ is added to the paste composition in particulate form. It is important that the $TiO_2$ be present as particles and not as a portion of the solid glass solution as heretofore employed. Otherwise, the problem of the reaction of the glass with the residual portion of the organic vehicle which results in grey-black, unsatisfactory, porous seals is not avoided. The $TiO_2$ is added in the form of a finely divided powder which preferably has a particle size of a micron or less. The amount of $TiO_2$, based on the weight of lead glass, should be sufficient to prevent adverse reaction between the organic vehicle and the lead glass during firing. The amount used is conveniently chosen in a range which will provide a coefficient of thermal expansion for the seal which is compatible with the CTE of the material being sealed. Preferred amounts range from about 1% to about 3% by weight $TiO_2$ based on the weight of glass.

Figure 2:
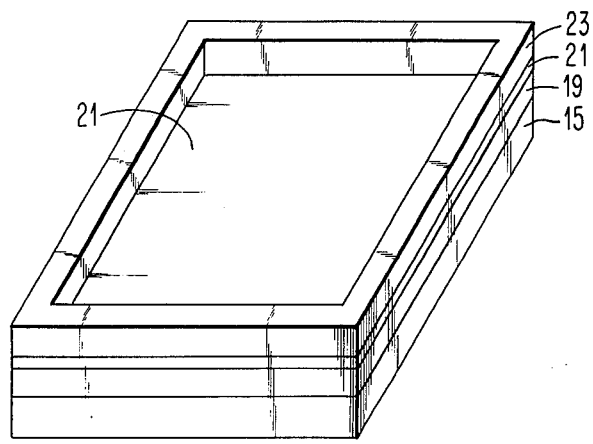
FIG. 2 is a plan view of the surface of one part of the panel shown in FIG. 1 illustrating the configuration of the sealing layer.
Figure 3:
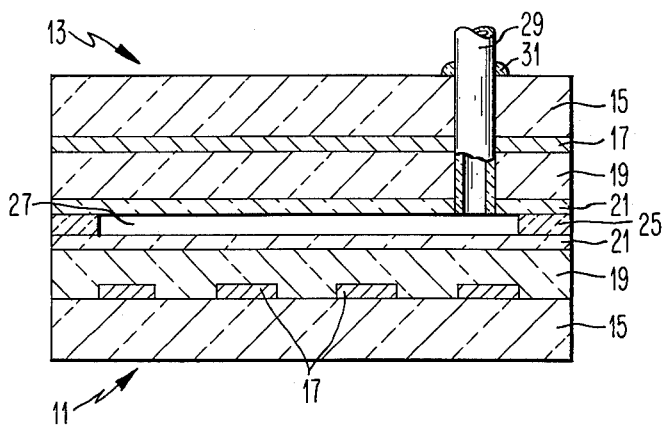
FIG. 3 is a side cross-sectional view of the panel illustrated in FIG. 1 after the two portions have been sealed together.

Turning now to FIG. 1, a side cross-sectional view of a gas panel structure is illustrated whose two portions 11 and 13 are to be sealed together to form a gas-tight chamber between them. Each portion 11 and 13 includes a glass substrate 15 which, in the illustrated embodiment, is a soda lime silica plate having a coefficient of thermal expansion equal to approximately $90 \times 10^{-7}$/°C. Metal conductor lines 17 and dielectric layers 19 are formed on the facing surfaces of substrates 15. In the illustrated embodiment, layer 19 is a 1 mil thick film of bubble-free lead glass having a composition, in weight percent, of 73.5% PbO, 12.6% $B_2O_3$, 13.7% $SiO_2$, and 0.2% $Al_2O_3$, a softening point of about 477°C, and a coefficient of thermal expansion equal to $90\times10^{-7}$/°C. Coated on top of the dielectric layers 19 are layers 21 of MgO which are used in order to extend the life of the panel. The MgO layers are subject to thermal damage in the form of crazing if they are heated to temperatures above about 420°C. Accordingly, the sealing process is carried out below this temperature in order to avoid thermal damage. Sealing layers 23 are applied to the periphery of the MgO surfaces 21 as illustrated in FIG. 2. The sealing layers are applied in the form of a paste which is applied by screen printing. Other conventional methods of application could also be used. Layers 23 are dried at a temperature, for example, of from about 150° to 240°C for one or two hours in order to remove the major portion of the organic vehicle. Layers 23 of the two portions 11 and 13 of the panel are then placed in contact and the structure is heated at a temperature of about 400°–420°C in order to form sealing layer 25 as illustrated in FIG. 3. A gas-tight chamber 27 is formed between portions 11 and 13 of the gas panel structure. In the illustrated embodiment, filler tube 29 is contained in portion 13 to provide means to fill the chamber 27 with a suitable gas to complete the panel structure. Tube 29 is sealed to substrate 15 by a lead glass paste composition layer 31 of the invention which seals the tube 29 to portion 13 during the panel sealing process.

The following examples further illustrate the sealing process using different paste sealing compositions to form a panel as is illustrated in the drawings. Parts are parts by weight unless otherwise indicated.

EXAMPLE 1

A glass paste composition was formed and applied to each portion 11 and 13 by screen printing to a thickness of about a 8 ± 1 mils. The lead glass comprised, in weight percent, 74.8% PbO, 8.6% $B_2O_3$, 2.0% $SiO_2$, 1.7% $Al_2O_3$, 0.7% BaO, 12.0% ZnO, and 0.2% $Na_2O$. The glass was in the form of a powder which passed through a 325 mesh screen, U.S. standard sieve series. 1.0% by weight of $TiO_2$ was added to the glass powder in the form of finely divided particles of $TiO_2$ having a particle size of below about 1 micron. The glass and $TiO_2$ were thoroughly mixed with an organic liquid vehicle, terpineol in a proportion of solid to liquid of 88:12. After the layer had been screened onto the surface of the MgO as illustrated in the drawings, the seal layers were dried at a temperature of from about 150 to 240°C for between about 1 and 2 hours. The sealing of the two portions of the substrate 11 and 13 was then completed by placing the sealing layers 23 in contact and heating the structure at a temperature between about 400° and 410°C for 2 hours. The appearance of the seal was white. The sealing layer had a thickness of about 4 mil which was achieved without the need for any auxilliary thickness determining shims as would be required when using rod sealing. The seal was determined to be adherent and leak-tight. The CTE was 90 $\pm 3\times10^{-7}$/°C which made it compatible with the glass materials of substrates 15 and layers 19.

EXAMPLE 2

The sealing process of example 1 was repeated employing a slightly different sealing glass composition comprising, by weight, 76% PbO, 9% $B_2O_3$, 2% $SiO_2$, 2% BaO, and 11% ZnO to which was added about 3% by weight of finely divided $TiO_2$. The solid to liquid portion in the paste was 88 parts solid to 12 parts terpineol. The drying time and temperature was 150° and 240°C for 1 to 2 hours and the sealing temperature and time was 410°C for 2 hours. The CTE of the seal glass was determined to be about 92 $\pm 3\times10^{-7}$/°C.

The resulting seal appearance was white, adherent and leak-tight.

EXAMPLE 3

The sealing process of example 1 was repeated with a third composition as follows:

75.5% PbO, 9.0% $B_2O_3$, 2.0% $SiO_2$, 0.5% $Al_2O_3$, 2.0% BaO and 11.0% ZnO to which was added 2.5% of $TiO_2$ powder. The portions of solids of terpineol in the paste was 90:10. The drying and sealing times and temperatures were the same as for example 1. A white, leak-tight seal having a coefficient of thermal expansion of 90 $\pm 3\times10^{-7}$/°C was produced.

EXAMPLE 4

In order to illustrate the necessity that the $TiO_2$ be added in the form of a powder and not included in the solid solution as part of the lead glass composition, the following procedure was carried out. 1% by weight of $TiO_2$ was included as part of a lead glass melt. The lead glass was cooled and ground to a powder which would pass through a 325 mesh screen. The composition included, by weight, $TiO_2$ 1%, PbO 74.0%, $B_2O_3$ 8.5%, $SiO_2$ 2.0%, $Al_2O_3$ 1.7%, BaO 0.7%, Zno 11.9% and $Na_2O$ 0.2%. The percentage composition was, therefore, comparable to that employed in example 1 except that in example 1 the $TiO_2$ was present in the paste in the form of separate particles rather than as part of the lead glass. The composition had a coefficient of thermal expansion of 95 $\pm 3\times10^{-7}$/°C. The sealing layer was applied and dried as in example 1 at a temperature of from 150° to 240°C for from 1 to 2 hours after which the sealing layers were placed in contact and the portions 11 and 13 of the gas panel were sealed by heating the structure at a temperature of about 410°C for 2 hours. The resulting seal appearance was grey-black and the seal was not bonded to the plates. This example demonstrates the necessity of having the $TiO_2$ present in particulate form rather than as part of the lead glass in order to achieve a satisfactory seal. Although the mechanism is not precisely understood as to why satisfactory seals can be obtained by the process of the invention, it is believed to be due to the fact that the $TiO_2$ reacts with the residual organic vehicle to eliminate lead glass reduction by the residual vehicle. Otherwise small amounts of residual vehicle, which apparently resist removal even under conditions of time and temperature where complete removal would be expected, react with the lead glass after the softening point of the glass has been reached to produce a grey, porous, non-bonded seal.

The composition and process of the invention permit the use of frit paste glass sealing compositions which will form seals at temperatures which do not thermally damage the surfaces of the structures being sealed. It has advantages over rod sealing processes which require higher temperatures and pressures along with thickness determining shims. The paste seal process also avoids the problems associated in fabricating very low temperature seal rods to the required tolerances. The process of the invention produces white, gas-tight seals.

While the invention has been particularly shown and described with reference to preferred embodiments thereof, it will be understood by those skilled in the art that various changes in form and details may be made therein without departing from the spirit and scope of the invention.

What is claimed is:

1. A glass sealing composition comprising a paste including; particles of a lead glass, said glass having a composition of, by weight, from about 66% to about 76% PbO, from about 8.6% to about 14% $B_2O_3$, from about 10% to about 12% ZnO, from about 2% to about 4% $SiO_2$, from about 0.7% to about 2% BaO, from 0 to about 5.0% CuO, from 0 to about 1.7% $Al_2O_3$, and from 0 to about 0.2% $Na_2O$; from about 1 to about 3% by weight of said glass of finely divided $TiO_2$; and from about 5 to about 20% by weight based on the total weight of paste of terpineol.

2. A process for forming a solid sealing glass layer on a surface comprising the steps of:
    forming a paste layer, said paste including; particles of a lead glass, said lead glass having a composition of, by weight, from about 66% to about 76% PbO, from about 8.6% to about 14% $B_2O_3$, from about 10% to about 12% ZnO, from about 2% to about 4% $SiO_2$, from about 0.7% to about 2% BaO, from 0 to about 5.0% CuO, from 0 to about 1.7% $Al_2O_3$, and from 0 to about 0.2% $Na_2O$; from about 1 to about 3% by weight of said glass of finely divided $TiO_2$; and from about 5 to about 20% by weight based on the total weight of paste of terpineol;
    drying said paste layer, and;
    firing said paste layer in contact with said surface at a temperature sufficient to remove the terpineol and fuse the glass particles into a solid sealing glass layer.

3. In a process for forming a gas panel, in which two substrates having conductor metallurgy formed on facing surfaces are joined together by an adherent glass sealing layer which provide a gas-tight chamber between the substrates, the improvement which comprises: forming the seal by applying to the periphery of at least one of the facing surfaces of said substrates a glass frit paste sealing composition comprising; particles of a lead glass, said lead glass having a composition of, by weight, from about 66% to about 76% PbO, from about 8.6% to about 14% $B_2O_3$, from about 10% to about 12% ZnO, from about 2% to about 4% $SiO_2$, from about 0.7% to about 2% BaO, from 0 to about 5.0% CuO, from 0 to about 1.7% $Al_2O_3$, and from 0 to about 0.2% $Na_2O$; from about 1 to about 3% by weight of said glass of finely divided $TiO_2$; and from about 5 to about 20% by weight based on the total weight of sealing composition of terpineol; drying said sealing composition and; firing said sealing composition in contact with both facing surfaces of said substrates at a temperature sufficient to remove the terpineol and fuse said composition into an adherent glass sealing layer.

* * * * *